(12) United States Patent
Etou et al.

(10) Patent No.: US 12,305,019 B2
(45) Date of Patent: May 20, 2025

(54) DIELECTRIC FILM FOR FILM CAPACITOR, FILM CAPACITOR AND CONNECTED CAPACITOR INCLUDING DIELECTRIC FILM, INVERTER, AND ELECTRIC VEHICLE

(71) Applicants: KYOCERA Corporation, Kyoto (JP); Shinshu University, Matsumoto (JP)

(72) Inventors: Kazuya Etou, Kirishima (JP); Kotaro Tanigawa, Kirishima (JP); Yasushi Murakami, Ueda (JP)

(73) Assignees: KYOCERA Corporation, Kyoto (JP); Shinshu University, Matsumoto (JP)

( * ) Notice: Subject to any disclaimer, the term of this patent is extended or adjusted under 35 U.S.C. 154(b) by 388 days.

(21) Appl. No.: 17/787,356

(22) PCT Filed: Dec. 7, 2020

(86) PCT No.: PCT/JP2020/045549
§ 371 (c)(1),
(2) Date: Jun. 20, 2022

(87) PCT Pub. No.: WO2021/131653
PCT Pub. Date: Jul. 1, 2021

(65) Prior Publication Data
US 2023/0051327 A1    Feb. 16, 2023

(30) Foreign Application Priority Data
Dec. 25, 2019  (JP) ................... 2019-235159

(51) Int. Cl.
*C08K 5/07* (2006.01)
*B60L 50/60* (2019.01)
*C08K 3/11* (2018.01)
*H01G 2/02* (2006.01)
*H01G 4/32* (2006.01)
*H01G 4/33* (2006.01)
(Continued)

(52) U.S. Cl.
CPC ............... *C08K 5/07* (2013.01); *B60L 50/60* (2019.02); *C08K 3/11* (2018.01); *H01G 2/02* (2013.01); *H01G 4/32* (2013.01); *H01G 4/33* (2013.01); *H01G 4/38* (2013.01); *H02M 7/5387* (2013.01); *H02P 27/06* (2013.01)

(58) Field of Classification Search
CPC .. C08K 5/07; C08K 3/11; B60L 50/60; H01G 2/02; H01G 4/32; H01G 4/33; H01G 4/38; H02M 7/5387; H02P 27/06
See application file for complete search history.

(56) References Cited

U.S. PATENT DOCUMENTS

2004/0129917 A1* 7/2004 Kubota ................ C04B 35/468
106/287.19
2007/0190249 A1* 8/2007 Hosokawa .......... C23C 16/4401
427/255.19
(Continued)

FOREIGN PATENT DOCUMENTS

CN    102666672 A    9/2012
CN    107108923 A    8/2017
(Continued)

*Primary Examiner* — Michael P McFadden
(74) *Attorney, Agent, or Firm* — Volpe Koenig

(57) ABSTRACT

A dielectric film for a film capacitor includes (A) a thermoplastic resin and (B) a metal diketone complex.

14 Claims, 5 Drawing Sheets

(51) Int. Cl.
    *H01G 4/38*    (2006.01)
    *H02M 7/5387*  (2007.01)
    *H02P 27/06*   (2006.01)

(56)           References Cited

U.S. PATENT DOCUMENTS

2007/0246636 A1* 10/2007 Katayama .............. B60L 50/15
                                                    248/637
2011/0181998 A1*  7/2011 Yang .................... H01G 4/30
                                                    361/275.4
2011/0255210 A1  10/2011 Tatemichi et al.
2012/0214921 A1   8/2012 Niino
2013/0314839 A1* 11/2013 Terashima .............. H01G 4/33
                                                    361/301.4

FOREIGN PATENT DOCUMENTS

EP         3239218 A1   11/2017
JP         53-81344 U    7/1978
JP          3-14866 A    1/1991
JP         3-209808 A    9/1991
JP        10-072552 A    3/1998
JP       2006-225484 A   8/2006
JP       2009-023918 A   2/2009

\* cited by examiner

DIELECTRIC FILM FOR FILM CAPACITOR, FILM CAPACITOR AND CONNECTED CAPACITOR INCLUDING DIELECTRIC FILM, INVERTER, AND ELECTRIC VEHICLE

FIELD

The present disclosure relates to a dielectric film for a film capacitor, a film capacitor and a connected capacitor each including the dielectric film, an inverter, and an electric vehicle.

BACKGROUND

A known technique is described in, for example, Patent Literature 1.

CITATION LIST

Patent Literature

Patent Literature 1: Japanese Unexamined Patent Application Publication No. 2006-225484

BRIEF SUMMARY

A dielectric film for a film capacitor according to an aspect of the present disclosure includes (A) a thermoplastic resin and (B) a metal diketone complex.

A film capacitor according to another aspect of the present disclosure includes a body including metalized films each including a metal film on the above dielectric film and being wound or stacked, and an external electrode on the body.

A connected capacitor according to another aspect of the present disclosure includes a plurality of the above film capacitors being connected by a busbar.

An inverter according to another aspect of the present disclosure includes a bridge circuit including a switching element, and a capacitance portion connected to the bridge circuit. The capacitance portion includes the above film capacitor or the above connected capacitor.

An electric vehicle according to another aspect of the present disclosure includes a power supply, an inverter connected to the power supply, a motor connected to the inverter, and a wheel drivable by the motor. The inverter includes the above inverter.

BRIEF DESCRIPTION OF DRAWINGS

The objects, features, and advantages of the present disclosure will become more apparent from the following detailed description and the drawings.

DETAILED DESCRIPTION

A film capacitor with the structure that forms the basis of a film capacitor according to one or more embodiments of the present disclosure includes either wound metalized films or metalized films stacked in one direction. The metalized films each include a dielectric film of, for example, a polypropylene resin and a metal film on a surface of the dielectric film. The metal film is formed by vapor deposition and serves as an electrode.

As electronic devices are miniaturized or capacitors have higher capacitance, electronic components are used in higher temperature environments. These electronic components are to be heat-resistant to achieve stable electrical characteristics over a long time in high-temperature environments.

Film capacitors may be miniaturized by reducing the thickness of a dielectric film, using fewer stacked dielectric films, or using fewer windings of dielectric films. Dielectric films to be thinner are to have an increased withstand voltage. For example, a dielectric film described in Patent Literature 1 is formed from a composite dielectric material including ceramic particles dispersed in an organic resin with epoxy groups to increase the withstand voltage.

For further miniaturized film capacitors, dielectric films for a film capacitor are to have a higher withstand voltage than known dielectric films.

One or more aspects of the present disclosure are directed to a dielectric film for a film capacitor with an increased withstand voltage, a film capacitor and a connected capacitor each including the dielectric film, an inverter, and an electric vehicle.

A dielectric film for a film capacitor according to the present embodiment includes (A) a thermoplastic resin and (B) a metal diketone complex.

Figure 1:
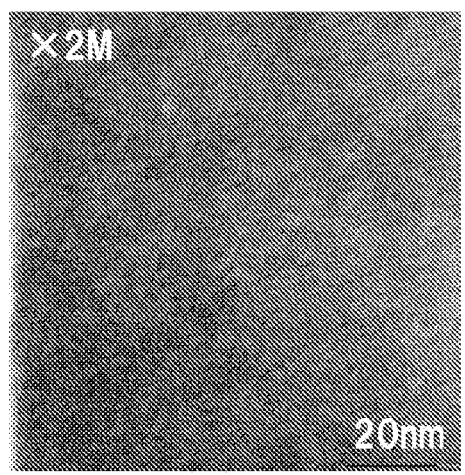
FIG. 1 is a scanning transmission electron microscope (STEM) photograph of a dielectric film for a film capacitor according to an embodiment.

The metal diketone complex is a complex including one or more diketones coordinating to the central metal. The metal diketone complex allows its central metallic element to be dispersed in the thermoplastic resin at the monomolecular level. The metal diketone complex dispersed in the thermoplastic resin does not react or bond with the thermoplastic resin, remaining as a complex or being dispersed at least in the form of the diketone and the metallic element. In the cross section of the dielectric film for a film capacitor observed with a scanning transmission electron microscope (STEM), the dispersed metallic element is visually less than or equal to 1 nm in diameter, as shown in FIG. 1. The unreacted state of the metal diketone complex with a thermoplastic resin, or for example, the absence of ester and ether bonds between the thermoplastic resin and acetylacetonate, is determined by nuclear magnetic resonance spectroscopy (NMR).

One common cause of resin degradation, or a lower withstand voltage as a characteristic of the dielectric film for a film capacitor, is the cleavage of intramolecular bonds due to oxygen. As described above, the dielectric film for a film capacitor according to the present embodiment includes the metallic element dispersed in the thermoplastic resin at the monomolecular level. Oxygen, which reacts with a metal complex to form a metal oxide, is trapped by the metallic element in the thermoplastic resin. This reduces the degradation of the thermoplastic resin characteristic. In particular, the metallic element is dispersed in the thermoplastic resin as a metal diketone complex at the monomolecular level.

This increases the metal element content per unit volume of the dielectric film for a film capacitor, or more specifically, increases the amount of oxygen being trapped. This increases the withstand voltage of the dielectric film for a film capacitor.

(A) Thermoplastic Resin

The thermoplastic resin includes, for example, at least one selected from the group consisting of a polycarbonate resin, a polyester resin, a polyarylate resin, a cyclic olefinic resin, a polyphenylene ether resin, a polyphenylene sulfide resin, and a polyetherimide resin. The thermoplastic resin may also be a copolymer of at least two of these resins. These resins are highly heat-resistant and used to provide a highly heat-resistant dielectric film for a film capacitor.

The polycarbonate resin of the above resins may include, for example, a polymer including repeating units represented by General formula 1, and the polyarylate resin may include, for example, a polymer including repeating units represented by General formula 2 or General formula 3.

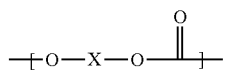
(1)

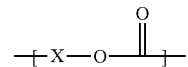
(2)

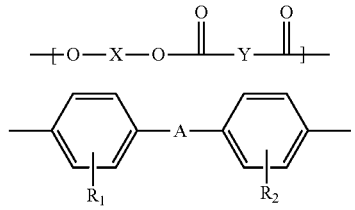
(3)

(4)

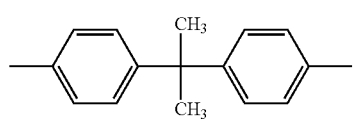

In General formula 1, X is at least one selected from the group consisting of an aliphatic divalent group, a cyclic aliphatic divalent group, and a divalent group represented by General formula 4. In General formula 2 or general formula 3, X is at least one selected from divalent groups represented by general formula 4. In General formula 3, Y is a substituted or unsubstituted arylene group.

In General formula 4, R1 and R2 each independently are a substituted or unsubstituted alkyl group or aryl group, or a halogen atom. A is a single bond, or a linear, branched, or cyclic alkylene group with 1 to 12 carbon atoms.

Specific examples of X in the above General formulas 1, 2, and 3 include divalent groups represented by General formulas 5a to 5n.

(5a)
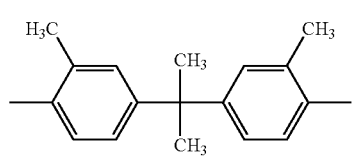

(5b)

(5c)
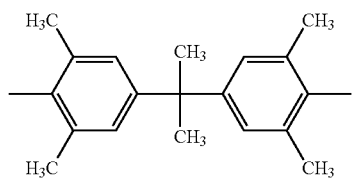

(5d)
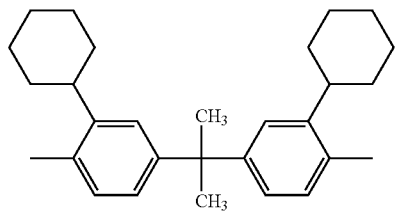

(5e)
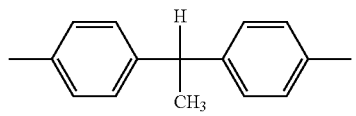

(5f)
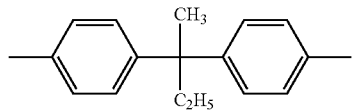

(5g)
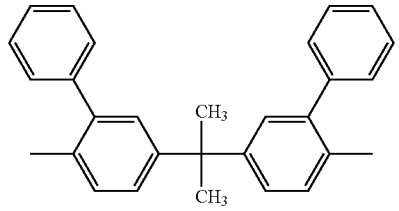

(5h)
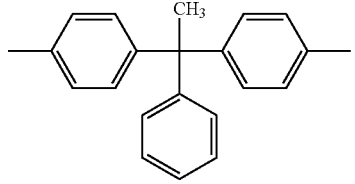

(5i)
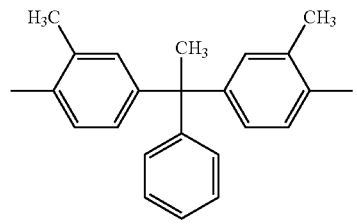

(5j)
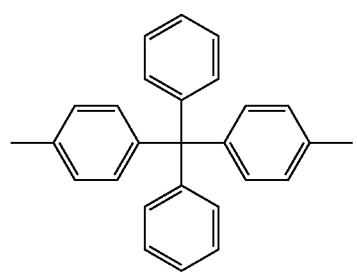

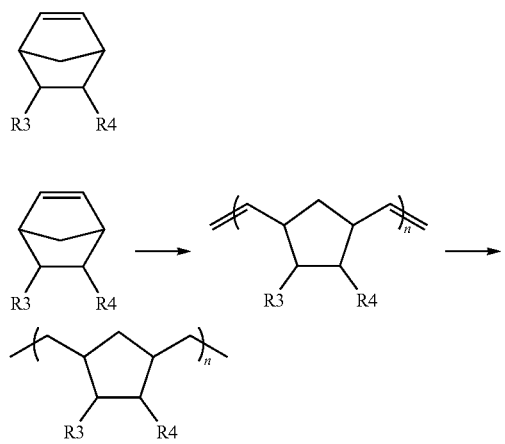

An example of (A) thermoplastic resin may be a cyclic olefinic resin. The cyclic olefinic resin includes, for example, a polymer of norbornene-based monomers shown in General formula 6, for example. The norbornene-based monomer is a type of cyclic olefin monomer, which is a compound including a ring structure of carbon atoms and a carbon-carbon double bond in the ring structure. The cyclic olefin monomer includes a monocyclic cyclic olefin as well as a norbornene-based monomer. The norbornene-based monomer forms a cyclic olefinic organic resin by ring-opening polymerization, vinyl copolymerization, vinyl polymerization, or radical polymerization as shown in the respective Reaction formulas 7 to 10.

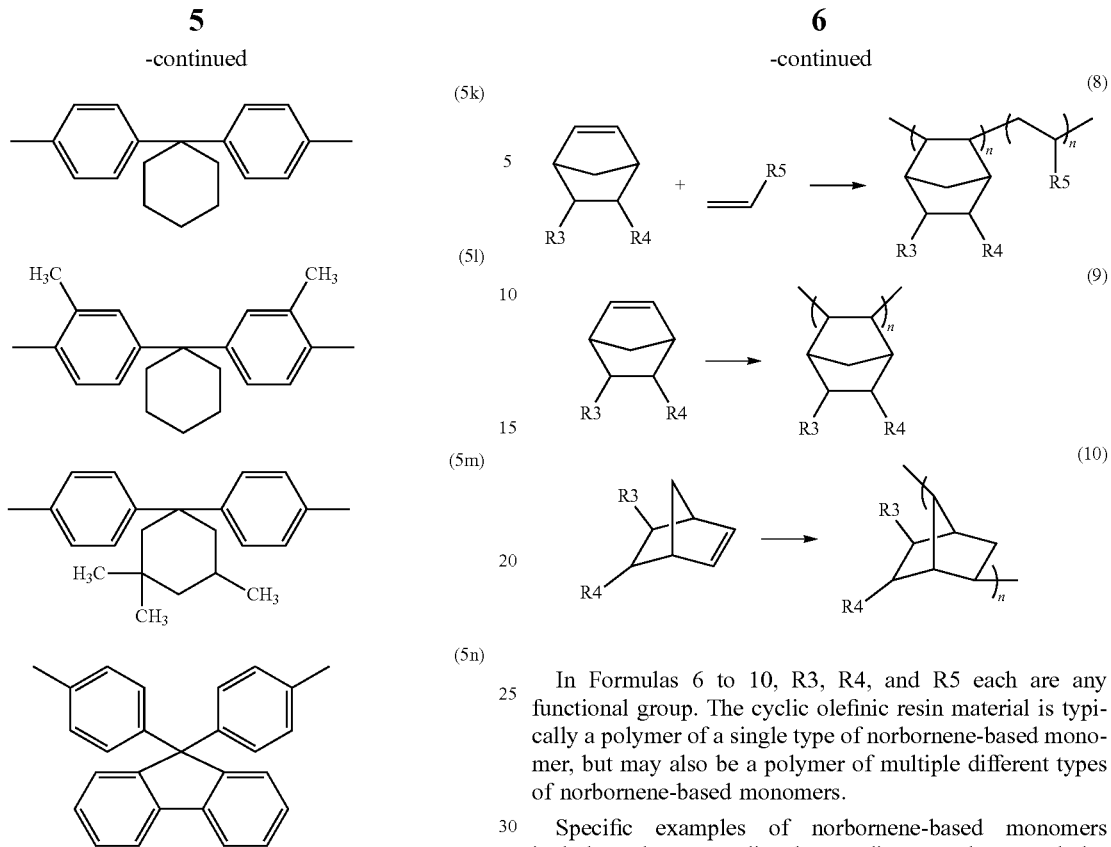

In Formulas 6 to 10, R3, R4, and R5 each are any functional group. The cyclic olefinic resin material is typically a polymer of a single type of norbornene-based monomer, but may also be a polymer of multiple different types of norbornene-based monomers.

Specific examples of norbornene-based monomers include norbornenes, dicyclopentadienes, and tetracyclododecenes. These monomers may contain hydrocarbon groups such as alkyl, alkenyl, alkylidene, and aryl groups or polar groups such as carboxyl and acid anhydride groups as a substituent, but may include nonpolar norbornene-based monomers alone, or more specifically, norbornene-based monomers containing carbon and hydrogen atoms alone.

Nonpolar norbornene-based monomers include nonpolar dicyclopentadienes, nonpolar tetracyclododecenes, nonpolar norbornenes, and nonpolar cyclic olefins with five rings or more.

Norbornene-based monomers may include additional double bonds other than the double bond in the norbornene ring.

More specifically, such cyclic olefinic resin materials commercially available include norbornene-based ring-opening polymers (hereafter simply referred to as ring-opening polymers) such as ARTON (registered trademark) from JSR Corporation and ZEONEX and ZEONOR (registered trademarks) from ZEON Corporation, and norbornene-based vinyl copolymers (hereafter simply referred to as vinyl copolymers) such as APEL and APO (registered trademarks) from Mitsui Chemicals, Inc. and TOPAS (registered trademark) from Polyplastics Co. Ltd. The cyclic olefinic resin materials may also include hydrogenated products of ring-opening polymers of monomers having a norbornene ring, addition polymers of monomers having a norbornene ring and α-olefins, addition polymers of cyclic olefins, hydrogenated products of addition polymers of cyclic olefins, addition polymers of cyclic dienes, and hydrogenated products of addition polymers of cyclic dienes. Of these, ring-opening polymers, or more specifically, ring-opening polymers of monomers having a norbornene ring may particularly facilitate film formation and be highly resistant to chemicals.

(B) Metal Diketone Complex

The metal diketone complex is a complex including one or more ligands at least including a diketone coordinating to the central metal. Diketones have two ketone groups in a molecule. The two ketone groups create a coordination bond with the central metal.

The metal diketone complex in the present embodiment has the central metal including at least one selected from the group consisting of Mo, V, Zn, Ti, Zr, and Al, for example. As described above, the metal diketone complex is dispersed in the thermoplastic resin, and the central metal traps oxygen to increase the withstand voltage of the dielectric film for a film capacitor.

The metal diketone complex in the present embodiment includes any diketone that coordinates to the above central metal. The ligands of the metal diketone complex may contain one or more β-diketones. For example, the diketone may include at least one selected from the group consisting of acetylacetonate (acetylacetone), dibenzoylmethane, ethyl acetoacetate, and diethyl malonate.

The metal diketone complex in the present embodiment may include the same type of diketones or multiple types of diketones coordinating. For example, for the central metal being Zr, four diketones coordinate to form a metal diketone complex. For each of the four ligands being acetylacetonate, the metal diketone complex is Zr acetylacetonate (Formula 11). For multiple types of diketones coordinating, at least one of the acetylacetonate ligands may be substituted by another diketone. For example, one of the four acetylacetonate ligands may be substituted by dibenzoylmethane.

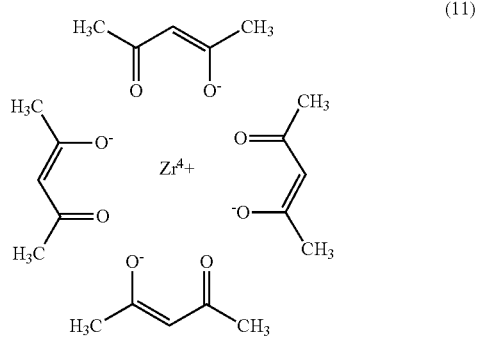

(11)

The dielectric film for a film capacitor according to the present embodiment has a metal diketone complex content of, for example, 0.5 to 10% by mass.

The dielectric film for a film capacitor according to the present embodiment may further include at least one of (C) a diketone, an alcohol, or a carboxylic acid as an additive. The additive (C) can reduce oxidation of the thermoplastic resin.

(C) Diketone, Alcohol, or Carboxylic Acid

The dielectric film for a film capacitor according to the present embodiment is obtained by, for example, dissolving a thermoplastic resin and a metal diketone complex in a solvent and forming a film of the resin solution. The metal diketone complex, which is insoluble in solvents that dissolve thermoplastic resins, may not be highly dispersed. Adding a diketone, an alcohol, or a carboxylic acid allows the metal diketone complex to be highly dispersed in the thermoplastic resin. The metal diketone complex highly dispersed in the thermoplastic resin increases the likelihood of oxygen being trapped by the central metal and reduces oxidation of the thermoplastic resin, further increasing the withstand voltage of the dielectric film for a film capacitor.

(C-1) Diketone

The diketone as an additive may be added separately from the above diketone as a ligand of the metal diketone complex. The diketone as an additive may be present as a single compound in the resin solution and in the dielectric film for a film capacitor. At least one of the diketone molecules as an additive may form a complex as at least one ligand of the metal diketone complex.

The diketone as an additive may be the same as the above diketone as a ligand. The diketone may be, for example, a β-diketone or a ketoacetate. For example, the β-diketone may be at least one of acetylacetonate (acetylacetone) or dibenzoylmethane. For example, the ketoacetate may be at least one of ethyl acetoacetate or diethyl malonate. The diketone as an additive may be the same compound as or a different compound from the above diketone as a ligand. For example, the metal diketone complex may be Zr acetylacetonate, and the additive may be the same compound, acetylacetone. In another example, the metal diketone complex may be Zr acetylacetonate, and the additive may be a different compound, dibenzoylmethane. When the different compound is used, the diketone as an additive may substitute for at least one of the ligands of the metal diketone complex in the resin solution and in the dielectric film for a film capacitor.

The dielectric film for a film capacitor according to the present embodiment has a diketone content of, for example, 0.05 to 10% by mass.

(C-2) Alcohol

Using an alcohol as an additive allows the metal diketone complex to be highly dispersed in the thermoplastic resin. The alcohol substitutes for at least one of the ligands of the metal diketone complex in the resin solution. Such an alcohol-substituted metal diketone complex is more soluble in solvents than unsubstituted complexes.

The alcohol as an additive may include, for example, at least one selected from the group consisting of methanol, ethanol, propanol, butanol, hexanol, 2-ethyl hexanol, octanol, nonanol, and decanol. The dielectric film for a film capacitor according to the present embodiment has an alcohol content of, for example, 0.05 to 10% by mass.

(C-3) Carboxylic Acid

The carboxylic acid as an additive may include, for example, at least one selected from the group consisting of acetic acid, propionic acid, butyric acid, valeric acid, lauric acid, tridecylic acid, palmitic acid, stearic acid, oleic acid, maleic acid, fumaric acid, succinic acid, citric acid, fumaric acid, lactic acid, tartaric acid, benzoic acid, and phthalic acid. The dielectric film for a film capacitor according to the present embodiment has an alcohol content of, for example, 0.05 to 10% by mass.

The dielectric film for a film capacitor according to the present embodiment may be obtained in the manner described below, for example. A thermoplastic resin is dissolved in a solvent, to which a metal diketone complex is added to obtain a resin solution. Other additives may be added as appropriate. The resultant resin solution may be used to form the dielectric film for a film capacitor on, for example, a polyethylene terephthalate (PET) substrate. The film may be formed with any known method selected from, for example, doctor blading, die coating, and knife coating.

The dielectric film for a film capacitor according to the present embodiment has a thickness of, for example, 0.1 to 10 The dielectric film for a film capacitor has a dielectric breakdown field strength of, for example, 550 to 650 V/μm at 125° C. and 650 to 750 V/μm at 25° C.

Examples of the solvent include ethylene glycol monopropyl ether, methyl ethyl ketone, methyl isobutyl ketone, xylene, propylene glycol monomethyl ether, a propylene glycol monomethyl ether acetate, dimethylacetamide, cyclohexane, ethyl cyclohexane, toluene, chloroform, tetrahydrofuran, and an organic solvent containing a mixture of two or more solvents selected from the above solvents.

The concentration of the thermoplastic resin (resin concentration) in the resin solution is, for example, 1 to 25% by mass. The concentration of the metal diketone complex in the resin solution is, for example, 0.015 to 3% by mass. The concentration of the diketone, alcohol, or carboxylic acid is, for example, 0.005 to 3% by mass.

Figure 2A:
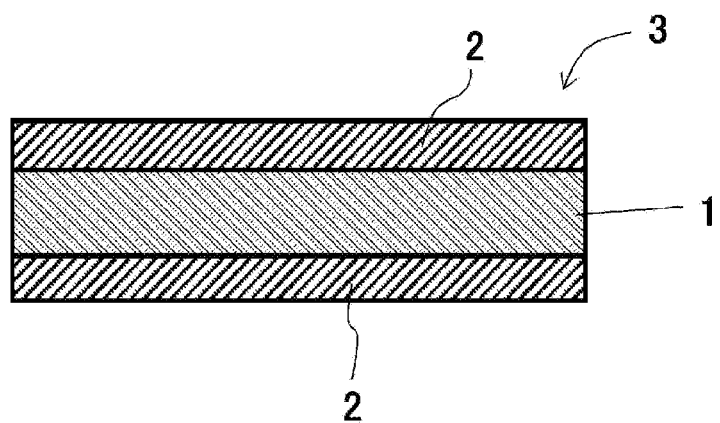
FIG. 2A is a schematic cross-sectional view of a structure including a dielectric film for a film capacitor and a metal film on a surface of the dielectric film.
Figure 2B:
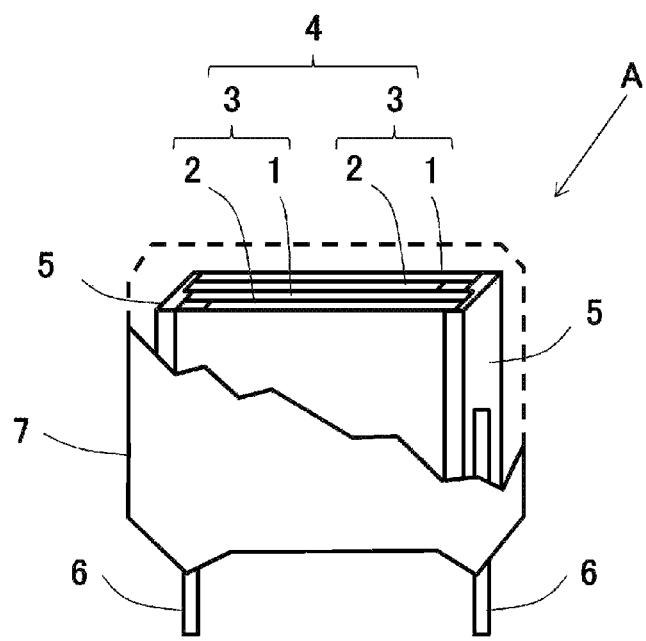
FIG. 2B is an external perspective view of a film capacitor according to a first embodiment.

FIG. 2A is a schematic cross-sectional view of a structure including a dielectric film for a film capacitor and a metal film on a surface of the dielectric film. FIG. 2B is an external perspective view of a film capacitor according to a first embodiment. In the first embodiment, a film capacitor A shown in FIG. 2B basically includes a body 4 including a stack of metalized films 3 and external electrodes 5 on the body 4. The metalized films 3 each include a dielectric film 1 for a film capacitor and a metal film 2 on a surface of the dielectric film 1. The film capacitor A may include lead wires 6 as appropriate.

In this example, the body 4, the external electrodes 5, and a part of the lead wires 6 may be covered with an enclosure 7 as appropriate for insulation and environmental resistance. In FIG. 2B, the enclosure 7 is partially removed, with the removed portion indicated by a dashed line.

In the present embodiment, the dielectric film 1 for a film capacitor may also be applicable to a wound film capacitor B, other than to the stacked film capacitor shown in FIGS. 2A and 2B.

Figure 3:
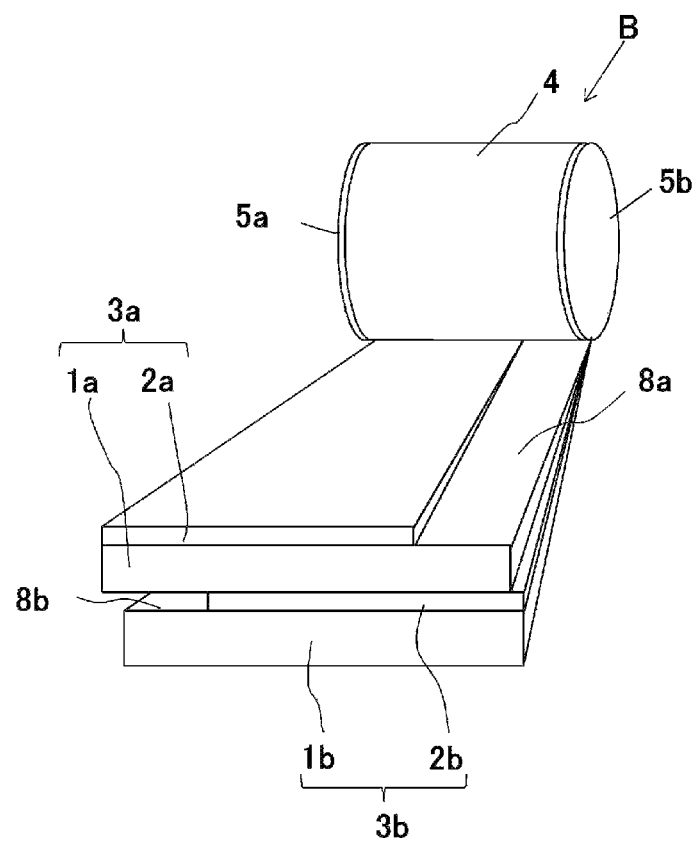
FIG. 3 is a schematic development perspective view of a film capacitor according to a second embodiment.

FIG. 3 is a schematic development perspective view of a film capacitor according to a second embodiment. In the present embodiment, the film capacitor B includes a body 4 including metalized films 3a and 3b wound together and metal-sprayed electrodes as external electrodes 5a and 5b on the opposite end faces of the body 4.

The metalized film 3a includes a dielectric film 1a for a film capacitor with a metal film 2a on its surface. The metalized film 3b includes a dielectric film 1b for a film capacitor with a metal film 2b on its surface. In FIG. 3, the metal film 2a or 2b is not located on one end portion of the dielectric film 1a or 1b for a film capacitor in the width direction of the dielectric film to allow a portion (hereafter referred to as a metal film-free portion 8a or 8b) of the dielectric film 1a or 1b for a film capacitor to remain exposed continuously in the longitudinal direction.

The metalized films 3a and 3b are arranged with the metal film-free portions 8a and 8b at different ends in the width direction of the dielectric films 1a and 1b for a film capacitor. The metalized films 3a and 3b are stacked in a manner deviated from each other with their ends each opposite to the metal film-free portion 8a or 8b protruding in the width direction.

In other words, the film capacitor B includes the metalized film 3a including the dielectric film 1a for a film capacitor and the metal film 2a, and the metalized film 3b including the dielectric film 1b for a film capacitor and the metal film 2b that are stacked and wound together as shown in FIG. 3. In FIG. 3, for ease of viewing the structure of the film capacitor B, the thicknesses of the dielectric films 1a and 1b for a film capacitor and the metal films 2a and 2b increase from the far side to the near side on the page of FIG. 3, although their actual thicknesses are constant.

Figure 4:
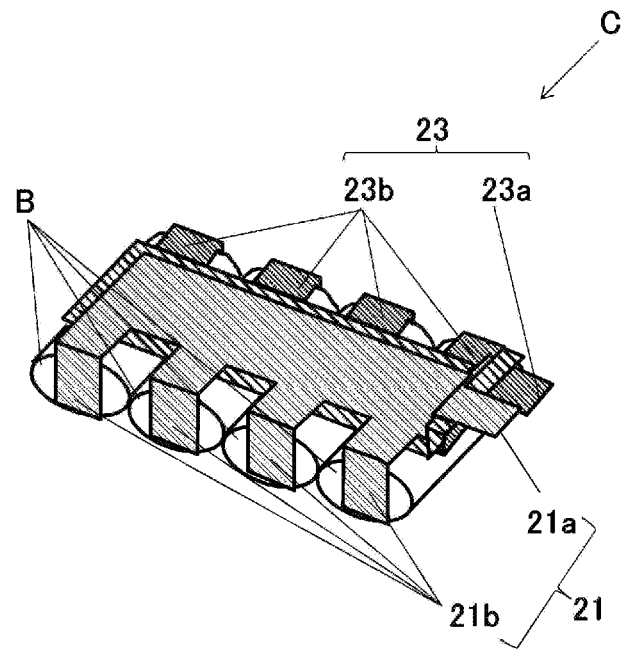
FIG. 4 is a schematic perspective view of a connected capacitor according to one embodiment.

FIG. 4 is a schematic perspective view of a connected capacitor according to one embodiment. In FIG. 4, for ease of explanation, a case and a molding resin are not shown. In the present embodiment, a connected capacitor C includes multiple film capacitors B connected parallel to each other with a pair of busbars 21 and 23. The busbars 21 and 23 include terminals 21a and 23a and output terminals 21b and 23b. The terminals 21a and 23a are used for external connection, and the output terminals 21b and 23b each are connected to the corresponding external electrodes 5a or 5b in the film capacitors B. The connected capacitor C may include the film capacitors A in place of the film capacitors B.

The dielectric film 1 for a film capacitor according to the present embodiment used as a dielectric film for a film capacitor to be included in the film capacitor A or B or the connected capacitor C is thinner than known dielectric films for a film capacitor formed from, for example, polypropylene or PET. The film capacitors A and B and the connected capacitor C can thus have a smaller size and higher capacitance.

The thermoplastic resin as a main component of the dielectric film 1 for a film capacitor may be a polyarylate resin, a polyphenylene ether resin, a cyclic olefinic resin, or a polyetherimide resin. In this case, the film capacitors A and B and the connected capacitor C are highly heat-resistant and provide capacitor products with a low decrease in capacitance and insulation resistance at high temperatures (e.g., in the atmosphere with a temperature of 80° C. or higher). In another example, the connected capacitor C may include the film capacitors B stacked with their flat surfaces overlapping each other to produce the same effects as the structure including the film capacitors B arranged in a planar manner as in FIG. 4.

Figure 5:
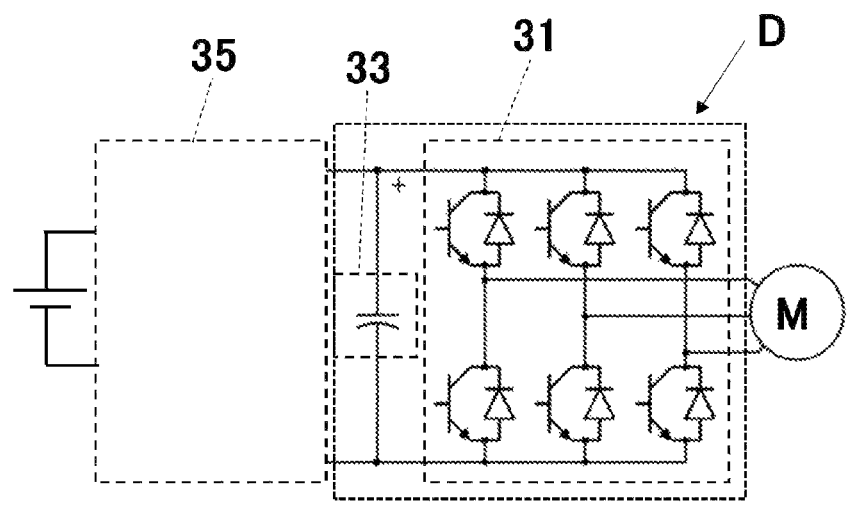
FIG. 5 is a schematic diagram of an inverter according to one embodiment.

FIG. 5 is a schematic diagram of an inverter according to one embodiment. FIG. 5 shows an example inverter D that converts rectified direct current (DC) to alternating current (AC). In the present embodiment, the inverter D shown in FIG. 5 includes a bridge circuit 31 and a capacitance portion 33. The bridge circuit 31 includes, for example, switching elements such as insulated gate bipolar transistors (IGBTs) and diodes. The capacitance portion 33 is located across the input terminals of the bridge circuit 31 to stabilize the voltage. The inverter D includes the above film capacitor A or B or the connected capacitor C as the capacitance portion 33.

The inverter D is connected to a booster circuit 35 that raises the voltage of a DC power supply. The bridge circuit 31 is connected to a motor generator (motor M) as a drive source.

The above film capacitor A or B or connected capacitor C according to the embodiments used as the capacitance portion 33 of the inverter D reduces the volume of the capacitance portion 33 in the inverter D. The resultant inverter D includes a smaller capacitance portion 33 with higher capacitance. The inverter D also has small fluctuations in modulation waves at high temperatures.

Figure 6:
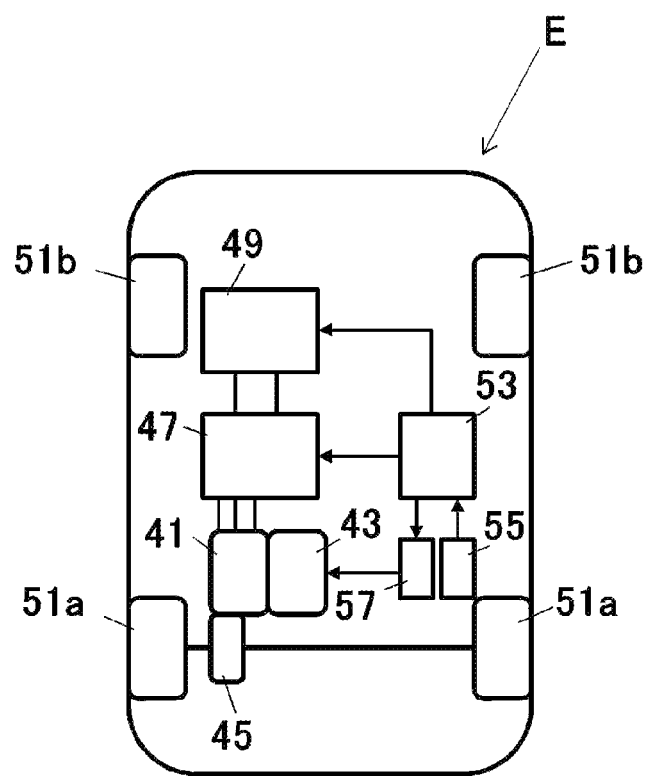
FIG. 6 is a schematic diagram of an electric vehicle according to one embodiment.

FIG. 6 is a schematic diagram of an electric vehicle according to one embodiment. FIG. 6 shows a hybrid electric vehicle (HEV) as an example electric vehicle E.

The electric vehicle E includes a drive motor 41, an engine 43, a transmission 45, an inverter 47, a power supply (battery) 49, front wheels 51a, and rear wheels 51b.

The electric vehicle E includes the motor 41, the engine 43, or both, as a drive source. The output from the drive source is transmitted to the pair of left and right front wheels 51a through the transmission 45. The power supply 49 is connected to the inverter 47, which is connected to the motor 41.

The electric vehicle E shown in FIG. 6 also includes a vehicle electronic control unit (ECU) 53 and an engine ECU 57. The vehicle ECU 53 centrally controls the entire electric vehicle E. The engine ECU 57 controls the rotation speed of the engine 43 and drives the electric vehicle E. The electric vehicle E further includes an ignition key 55 operable by, for example, a driver and driving components such as an accelerator pedal and a brake (not shown). The vehicle ECU receives an input of a drive signal in response to an operation on a driving component performed by, for example, the driver. The vehicle ECU 53 outputs, based on the drive signal, an instruction signal to the engine ECU 57, the power supply 49, and the inverter 47 as a load. In response to the instruction signal, the engine ECU 57 controls the rotation speed of the engine 43 and drives the electric vehicle E.

The film capacitor A or B or the connected capacitor C according to the embodiments may be used as the capacitance portion 33 to miniaturize the inverter D mounted on the electric vehicle E shown in, for example, FIG. 6. In this case, the vehicle can be more lightweight than when incorporating a large inverter including film capacitors or a connected capacitor including known dielectric films for a film capacitor formed from, for example, polypropylene or PET. In the present embodiment, the vehicle can be lightweight to improve fuel efficiency. Additionally, the control equipment in the automobile uses a smaller space in the engine compartment. When the control equipment uses a smaller space, the engine compartment can contain equipment for increasing impact resistance, thus further improving vehicle safety.

In addition to HEVs, the inverter D according to the present embodiment is also applicable to various power converting products such as electric vehicles (EVs), electric bicycles, power generators, and solar cells.

EXAMPLES

The dielectric film for a film capacitor according to one or more embodiments of the present disclosure will now be described in detail based on examples.

Examples

A polyarylate was used as the thermoplastic resin, Zr acetylacetonate was used as the metal diketone complex, and acetylacetone was used as the additive. The polyarylate was dissolved in toluene, in which Zr acetylacetonate and acetylacetone were further dissolved to obtain a resin solution with a thermoplastic resin concentration of 12% by mass, a metal diketone complex concentration of 0.36% by mass, and a diketone concentration of 0.18% by mass.

The resin solution was applied onto a PET substrate using a coater and dried at 125° C. for three hours to remove the solvent. This fabricates the dielectric films for a film capacitor in examples. A varying amount of the resin solution was applied to obtain a dielectric film for a film capacitor with a thickness of 2.0 μm (Example 1) and a dielectric film for a film capacitor with a thickness of 2.7 μm (Example 2).

Comparative Example

Other than using a resin solution containing neither Zr acetylacetonate nor acetylacetone, the same procedure as for Example 1 was used to obtain dielectric films for a film capacitor in a comparative example.

Characteristic Assessment

The dielectric breakdown field strength of each dielectric film for a film capacitor was measured in the manner described below. The PET film was separated from the dielectric film for a film capacitor, and an Al electrode layer with an average thickness of 75 nm was formed on the two surfaces of the dielectric film for a film capacitor by vacuum deposition to fabricate a metalized film. The resultant metalized film was subjected to measurement of dielectric breakdown field strength. ADC voltage was applied across the metal films of the metalized film at a voltage increase rate of 10 V per second in an atmosphere at 25° C. or 125° C., and the dielectric breakdown field strength was determined from the voltage value obtained upon the leakage current value exceeding 1.0 mA. The results are shown in Table 1.

TABLE 1

| | Film length (μm) | Dielectric breakdown field strength (V/μm) | | |
| --- | --- | --- | --- | --- |
| | | 25° C. | 125° C. | 150° C. |
| Example 1 | 2.0 | 740 | 622 | 481 |
| Example 2 | 2.7 | 680 | 618 | — |
| Comparative example | 2.0 | 608 | 504 | 363 |

The dielectric films in Examples 1 and 2 show higher dielectric breakdown field strength than the dielectric film in the comparative example in both the atmospheres at 25° C. and 125° C. In an atmosphere at 150° C., the dielectric film in Example 1 also shows higher dielectric breakdown field strength than the dielectric film in the comparative example.

The present disclosure may be implemented in the following forms.

A dielectric film for a film capacitor according to one or more embodiments of the present disclosure includes (A) a thermoplastic resin and (B) a metal diketone complex.

A film capacitor according to one or more embodiments of the present disclosure includes a body including metalized films each including a metal film on the above dielectric film and being wound or stacked, and an external electrode on the body.

A connected capacitor according to one or more embodiments of the present disclosure includes a plurality of the above film capacitors being connected by a busbar.

An inverter according to one or more embodiments of the present disclosure includes a bridge circuit including a switching element, and a capacitance portion connected to the bridge circuit. The capacitance portion includes the above film capacitor or the above connected capacitor.

An electric vehicle according to one or more embodiments of the present disclosure includes a power supply, an inverter connected to the power supply, a motor connected to the inverter, and a wheel drivable by the motor. The inverter includes the above inverter.

One or more embodiments of the present disclosure provide the dielectric film for a film capacitor with an increased withstand voltage, the film capacitor and the connected capacitor each including the dielectric film, the inverter, and the electric vehicle.

Although the embodiments of the present disclosure have been described in detail, the present disclosure is not limited to the above embodiments, and may be modified or changed variously without departing from the spirit and scope of the present disclosure. The components described in the above embodiments may be entirely or partially combined as appropriate unless any contradiction arises.

REFERENCE SIGNS LIST

A, B film capacitor
C connected capacitor
D, 47 inverter
E electric vehicle
1, 1a, 1b dielectric film for film capacitor
2, 2a, 2b metal film
3, 3a, 3b metalized film
4 body
5, 5a, 5b external electrode
6 lead wire
7 enclosure
8a, 8b metal film-free portion
21, 23 busbar
31 bridge circuit
33 capacitance portion
35 booster circuit
41 motor
43 engine
45 transmission
47 inverter
49 power supply
51a front wheel
51b rear wheel
53 vehicle electronic control unit (ECU)
55 ignition key
57 engine ECU

The invention claimed is:

1. A dielectric film for a film capacitor, the dielectric film comprising:
 (A) a thermoplastic resin;
 (B) a metal diketone complex; and
 (C) a diketone that is separate from the metal diketone complex and in an amount of 0.05 to 10% by mass.

2. The dielectric film according to claim 1, wherein
 (B) the metal diketone complex has a central metal including at least one selected from the group consisting of Mo, V, Zn, Ti, Zr, and Al.

3. The dielectric film according to claim 1, wherein
 (B) the metal diketone complex has a ligand including one or more β-diketones.

4. The dielectric film according to claim 1, wherein
 (B) the metal diketone complex has a ligand including at least one selected from the group consisting of acetylacetonate, dibenzoylmethane, ethyl acetoacetate, and diethyl malonate.

5. The dielectric film according to claim 1, wherein (C) the diketone includes either a β-diketone or a ketoacetate.

6. The dielectric film according to claim 5, wherein
 the β-diketone includes at least one of acetylacetonate or dibenzoylmethane, and the ketoacetate includes at least one of ethyl acetoacetate or diethyl malonate.

7. The dielectric film according to claim 1, wherein
 (A) the thermoplastic resin has a glass transition temperature of 50° C. or higher.

8. The dielectric film according to claim 1, wherein
 (A) the thermoplastic resin includes at least one selected from the group consisting of a polycarbonate resin, a polyester resin, a polyarylate resin, a polyphenylene ether resin, a polyphenylene sulfide resin, and a polyetherimide resin.

9. A film capacitor, comprising:
 a body including metalized films each including a metal film on the dielectric film according to claim 1, the metalized films being wound or stacked; and
 an external electrode on the body.

10. A connected capacitor, comprising:
 a plurality of the film capacitors according to claim 9, the plurality of film capacitors being connected by a busbar.

11. An inverter, comprising:
 a bridge circuit including a switching element; and
 a capacitance portion connected to the bridge circuit, the capacitance portion including the film capacitor according to claim 9.

12. An inverter, comprising:
 a bridge circuit including a switching element; and
 a capacitance portion connected to the bridge circuit, the capacitance portion including the connected capacitor according to claim 10.

13. An electric vehicle, comprising:
 a power supply;
 an inverter connected to the power supply;
 a motor connected to the inverter; and
 a wheel drivable by the motor,
 wherein the inverter includes the inverter according to claim 11.

14. The dielectric film according to claim 1, wherein an amount of the metal diketone complex is in an amount of 0.05 to 10% by mass.

* * * * *